United States Patent

[11] 3,587,295

| [72] | Inventor | Sanford L. Simons<br>Morrison, Colo. |
|---|---|---|
| [21] | Appl. No. | 807,011 |
| [22] | Filed | Mar. 13, 1969 |
| [45] | Patented | June 28, 1971 |

[54] COAGULATION AND VISCOSITY TEST APPARATUS AND METHOD
8 Claims, 10 Drawing Figs.

[52] U.S. Cl. .................................................. 73/64.1, 73/54, 73/67.6
[51] Int. Cl. ..................................................... G01n 29/02, G01n 33/16, G01n 11/00
[50] Field of Search ........................................... 73/64.1, 64, 53, 54, 59, 67.6

[56] References Cited
UNITED STATES PATENTS

| 1,836,316 | 12/1931 | Esau | 73/64X |
| 2,700,894 | 2/1955 | Van Valkenburg | 73/67.6 |
| 2,707,391 | 5/1955 | McSkimin | 73/59 |
| 2,839,915 | 6/1958 | Roth et al. | 73/59 |
| 2,903,884 | 9/1959 | Kritz | 73/53X |
| 2,966,056 | 12/1960 | Heller | 73/53X |
| 3,040,562 | 6/1962 | Fitzgerald et al. | 73/53UX |

FOREIGN PATENTS

| 899,057 | 5/1945 | France | 73/54 |
| 1,311,330 | 10/1962 | France | 73/54 |

Primary Examiner—Louis R. Prince
Assistant Examiner—Joseph W. Roskos
Attorney—C. B. Messenger ABSTRACT: Apparatus and method for determining the coagulation and/or viscosity characteristics of fluids in which a sample of a biological or other fluid is mechanically agitated and the energy transmitted by said fluid is received and evaluated by energy sensitive means to determine the instantaneous and/or sequential energy being transmitted. A readout indicative of fluid viscosity and developing coagulation is obtained that may be coordinated with expired time. A transponder derived vibrational input and a transducer readout is disclosed.

INVENTOR.
SANFORD L. SIMONS
BY
ATTORNEY

COAGULATION AND VISCOSITY TEST APPARATUS AND METHOD

BACKGROUND OF THE INVENTION

The present apparatus is developed to provide information relating to a characteristic of fluids. The apparatus is intended to provide data and parameters on the coagulation characteristics of fluids and mixtures so that response times may be determined or regulated. The apparatus and method can be used for the determination of viscosities of such fluids where flow characteristics are being studied. An important and perhaps primary use of the invention is directed to studies of biological fluids in which the coagulation rate of the fluid may be indicative of deficiencies in general health, digestion, blood circulation rates, dehydration and of other factors that are dependent upon fluid circulation capabilities and patterns in the body or in inanimate tissue.

One specific and beneficial use of the invention has been established in connection with studies of blood and blood components. In such field the use of modern drugs and medicants that thin or thicken the blood has been hampered by the absence of methods and means for determining an existing consistency and for further determining the prospective consistency after the administration of specific drugs. The invention provides a means and method for determining the coagulation characteristics of whole blood samples or for samples of blood components. With the establishment of the initial and developed coagulation characteristics, the medical practitioner will be able to more efficiently determine a course for additional treatment and drug administration.

Since the coagulation characteristics of blood are dependent upon many different factors and undoubtedly on the individual combination of components in any particular sample, previous measurements and counts of blood components and of viscosities have not provided reliable information on coagulation characteristics.

SUMMARY OF THE INVENTION

Primarily the invention presents a method for determining the coagulation characteristics of fluids. The method entails subjecting the fluid to a mechanical energy input and measuring the intensity of energy that is transmitted by the fluid. Changes in the quantity or amplitude of energy transmission is coordinated with the time of exposure and/or excitation to obtain output data that may be experimentally related to the coagulation tendencies and characteristics of the fluid.

In the practice of the invention a measured specimen of fluid, such as blood, is retained in a cup, and an exciter rod is inserted into the body of fluid in position out of contact with the container. The rod is excited or moved with respect to the specimen fluid by a vibrational energy input or other means, and a pickup is provided to determine the intensity of energy that is transmitted by the fluid. The intensity of transmitted energy is evaluated by readout mechanisms which may be coupled to a permanent type recorder so that progressive changes in the amount of energy transmission will be made apparent. These changes in the amount and quality of energy transmitted can be related to the coagulation characteristic of the sample or alternately the instantaneous energy transmission can be related to the then viscosity of the fluid.

In alternate arrangements the input energy and output reading functions of exciter and container may be reversed. In a preferred form of the invention a transponder is used to provide a vibrational energy input, while a transducer and pickup combination provides an output reading. These elements may be interconnected with various amplifiers, oscillators, etc. to provide alternate forms of apparatus having distinctive operational characteristics.

DESCRIPTION OF THE PREFERRED EMBODIMENTS

As a method for determining the coagulation characteristics of fluids, the invention contemplates the establishment of mechanical movement patterns in the fluid itself. The fluid in motion contacts a pickup element or a component thereof and transmits a portion of the induced energy to the pickup. A reading of the energy level thus established in the pickup components is obtained. The derived energy level at the pickup is correlated against the time of exposure and/or excitation and progressive changes in the level of energy transmitted are used to determine the coagulation characteristics of the fluid. Instantaneous readings may be used as a measure of viscosity of the establishment of laboratory or analytical values. The entire time coordinates may not be necessary, and, accordingly, the method encompasses a system in which an energy level at an initiation point and the transmitted energy level at a later, intermediate or end point are used to define a prospective coagulation characteristic for the fluid sample. In practice of the method the sample may be either isolated or exposed to standard, constant or changing environmental conditions.

While the mechanical excitation of the sample may be accomplished by fluid accelerating, pumping or compressing devices, vibrational energy can be beneficially used for such purposes. Where a vibrational energy input is utilized, efficient measurement of energy level outputs may be obtained by use of radio and electronic apparatus. In function the purpose of any apparatus used is to determine the efficiency and quality of the fluid coupling acting between a mechanical energy input and a detector apparatus exposed to the fluid. Measurements of such coupling efficiency can be obtained by determining the balance between input and output rates of energy, or a similarly useful result may be obtained by simply distinguishing the changes in energy level output over a specified time span.

Figure 1:
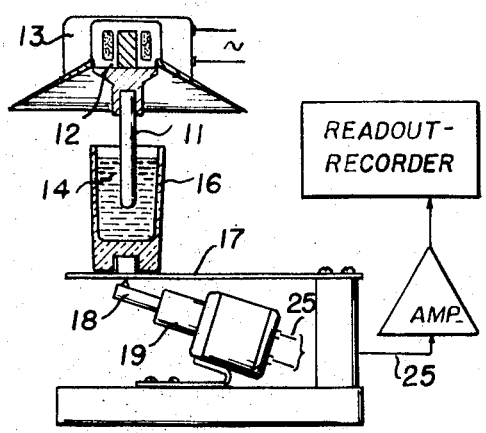
FIG. 1 presents a combination schematic and side elevation in partial section showing a first apparatus embodiment of the invention.

Representative different embodiments of apparatus that may be used in connection with the present invention are disclosed in the accompanying drawings. In FIG. 1 a simplified type of apparatus is illustrated. Here an exciter rod 11 is connected to the armature 12 of a speaker 13. A sample of fluid 14 is retained in a cup 16, and the rod 11 is immersed in the sample but in position out of contact with the cup 16. The cup 16 is mounted on a leaf spring 17, and movement of the cup and spring is picked up by the needle 18 of a phonopickup cartridge 19. The output from the phonopickup is carried by the wires 25 to an amplifier and subsequently to readout or recorder components. In such assembly the speaker 13 is a transponder component, while the phonopickup 18—19 is a transducer.

Figure 5:
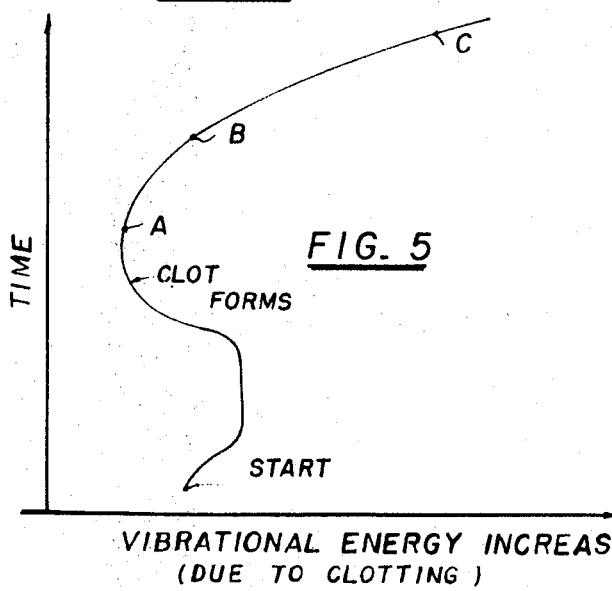
FIG. 5 presents a representative graph or analog readout characteristic of apparatus used in connection with the testing of a blood sample.

Samples of blood, plasma and various other biological fluids have been tested with such apparatus. In making a test approximately 0.4 cc. of blood or plasma, which is sometimes intermixed with a $CaCl_2$ solution, is received in the cup, and a Teflon rod 11 is immersed therein. The $CaCl_2$ solution is used as a recalcifier to induce clotting of the sample. Where a ½-mole solution is used, it is added in a ratio or approximately 1 part solution to 11 parts of sample. When the transponder-speaker is energized by a 60 cycle power source or by other intermittent or cyclic power sources, such as that from an oscillator input, a characteristic change in the energy transmitted to the transducer by the fluid couple in the sample cup 16 will be noted with time. Where the clotting characteristics of blood and plasma are being investigated a clot, as shown in FIG. 5, can be obtained on recorder apparatus, such as a multichannel Visicorder. In such FIG. there is an increase in the energy level transmitted with time. This increased energy transmission is due to the clotting of the blood or plasma sample. After an initial start there is a temporary decrease as the sample fluidizes and a subsequent increase after a clot starts to form.

Investigations have been made to correlate the information derived from the described apparatus with the known body fluid characteristics of different patients. From such study it is determined that the speed or rate of clot formation values attained from use of the apparatus can be beneficially used in experimental and clinical functions as an aid to a physicians's diagnosis and treatment of patients. In the treatment of heart and circulatory system disorders the studies can be used to determine the amount of anticoagulant or blood coagulating medicines that can be prescribed and administered without endangering the health and well-being of the patient due to the use of inadequate medicines or excessive overdoses.

While more sophisticated types of apparatus have been developed and used for laboratory studies and analysis, a simplified type of system is proposed for use in doctors' offices and clinics for diagnostic purposes. Where adequate determination has previously been made of the characteristics of the clotting tendencies of a broad spectrum of the general public, it is expected that the need for a recorder component may be eliminated. Analysis of the energy levels transmitted by the fluid couple at set intervals of time could under such conditions indicate the clotting characteristics for a particular sample. In other words, apparatus that gave readings at discreet times A, B and C as shown in FIG. 5 could substantially reveal the overall clotting characteristics of the sample.

Present studies have indicated that certain controls may be necessary in establishing the environment for the sample being analyzed. Such factors as the size, surface finish and material of construction for the receiving cup 16 and rod 11 are of importance. The materials, surface finish and all other such factors can, of course, be established and maintained uniformly where a specific type of analysis apparatus is made and sold. Standardization of components and procedures will, of course, promote the utility and efficiency of devices made in accordance with this invention. Present studies have, however, indicated a wide variety of configurations and instrument combinations that may be used to accomplish the desired result.

Figure 7:
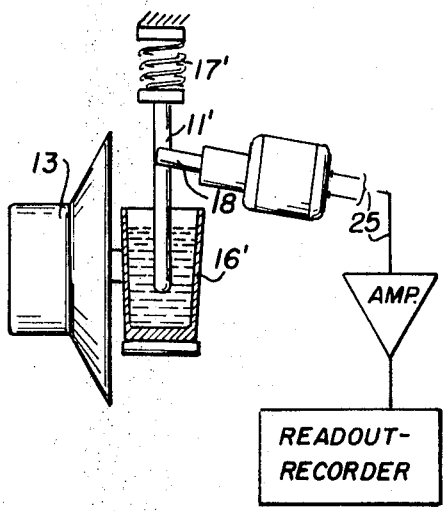
FIG. 7 is a combination schematic and side elevation in partial section illustrating a reversed arrangement of the components of FIG. 1.

As an adaptation of the apparatus shown in FIG. 1 it has been noted that the combination of parts may be reversed. In FIG. 7 the sample cup 16 is mounted on and vibrated by the transponder components, while a readout is obtained from a rod 11' coupled to the transducer component.

Figure 8:
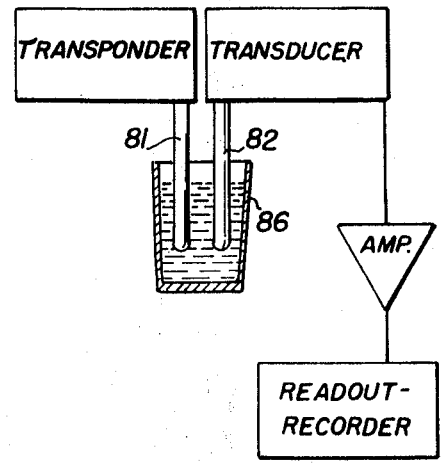
FIG. 8 illustrates a further modified type of apparatus.

In a further embodiment of the invention shown in FIG. 8 the strength of the fluid couple exerted by the sample can be established by a pair of rods immersed in regulated positions in the sample being studies. In such configuration of a rod 81 can be the fluid exciting element, while a second rod 82 immersed in a sample received in the same cup 86 is the pickup element. In keeping with previous disclosures the exciter rod 81 is connected with a transponder, while the pickup rod 82 is connected to a transducer component. The reading provided by the readout-recorder apparatus is similar to that shown in FIG. 5. Again such readout can indicated instantaneous viscosities or the progression of coagulation functions for the sample as the period of excitation and readout is continued.

Figure 2:
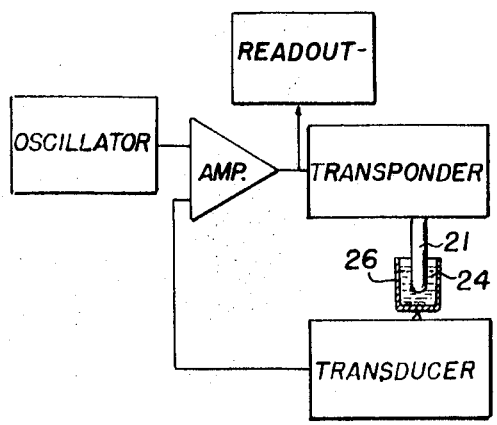
FIG. 2 is a schematic illustration of a second apparatus embodiment of the invention.

A further embodiment of the invention that is similar to those disclosed by FIGS. 1, 7 and 8 is presented in schematic form by FIG. 2. In this apparatus an oscillator is coupled to an amplifier, and the output of the amplifier is transmitted to a transponder component. The transponder is coupled to an exciter rod 21 that may be immersed in a sample 24 held within cup 26. Mechanical energy is transmitted from the exciter rod to the cup 26 by the fluid couple provided by sample 24. The level of mechanical energy transmitted is sensed by the transducer, and a signal therefrom is returned to the amplifier with a readout being obtained at the output of the amplifier. Such readout may in the present instance be provided by a signal level meter, an oscilloscope, or by the displacement of an indicator needle or pin on recorder apparatus. This particular circuit arrangement is intended to maintain a constant amplitude output for the exciter rods 21 with the cup sample transducer providing a control feedback. The readout will then indicate the change in power that is necessary to maintain the constant amplitude of excitation for the exciter rod 21.

Figure 3:
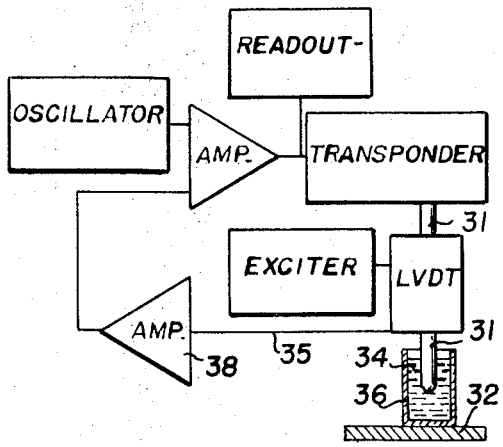
FIG. 3 is a schematic circuit for a third apparatus embodiment of the invention, FIG. 4 provides the schematic circuit for a further embodiment of the invention.
Figure 4:
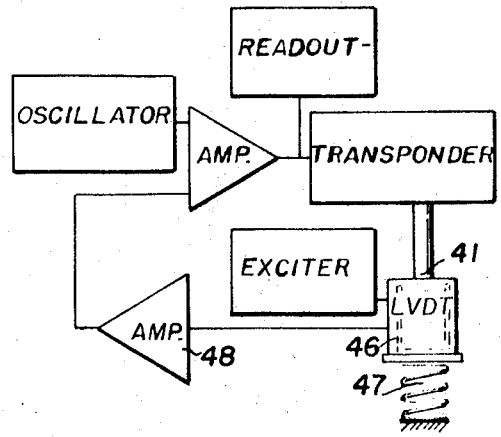

FIGS. 3 and 4 present a modified type of apparatus in which the object is to obtain a reading that indicates the amount of energy or the change in the amount of energy that is absorbed by the sample as clotting progresses. As in the FIG. 2 embodiment, the transponder is coupled to a sample rod 31. The rod 31 is exposed to the sample 34 in cup 36. In FIG. 3 the sample cup 36 is rigidly anchored to a support 32, and, accordingly, the cup itself does not move. A Linear Variable Differential Transformer (LVDT) having its separate exciter components coupled thereto is mounted on or with the rod 31 to sense the changes in position for the rod. The output from the LVDT on line 35 is amplified and demodulated at 38 and then recoupled into the oscillator amplifier to provide a readout which is indicative of the amount of damping exerted on the rod 31 by the sample 34 and any clots forming therein. The apparatus in FIG. 4 is similar except that in this installation the cup 46 is mounted on a spring assembly 47, and the movement of the cup as energized by the fluid couple existing between the exciter rod 41 and the cup 46 is sensed by the LVDT.

Figure 6:
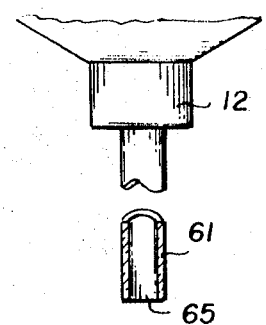
FIG. 6 is a partial cross section showing alternate type of rod.

For all embodiments of the invention the rod may be formed of a solid material, as shown in FIGS. 1, 2, 3, 4, 7, 8 and 10, or a closed end tube. For some types of rod excitation an end effect may result when a solid or closed end rod is used. FIG. 6 presents a rod 61 that is formed of an open end tube. Since the end 65 is open, the end effects mentioned will be eliminated or minimized. For the FIG. 6 illustration the tube rod 61 is coupled to the armature 12 of a speaker-transponder similar to that shown in FIG. 1.

Biological and other types of fluid are recognized to be mechanically sensitive. The mechanical excitation provided by the vibrations of the described apparatus tends to promote coagulation or clotting when blood samples are being tested. Additional biological or viscous fluids having dispersions of macroscopic particles or fibers can be tested with the described apparatus. Body fluids, such as tears, sweat, urine, etc., and other plant and animal fluids may be tested with the described apparatus.

Figure 9:
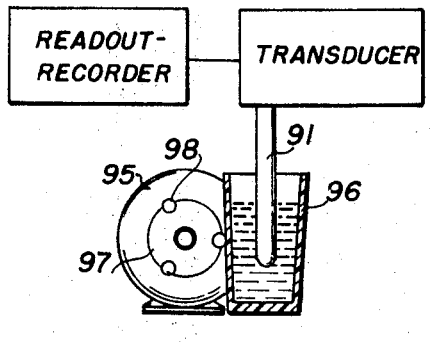
FIG. 9 shows a separate type of mechanical energy input.
Figure 10:
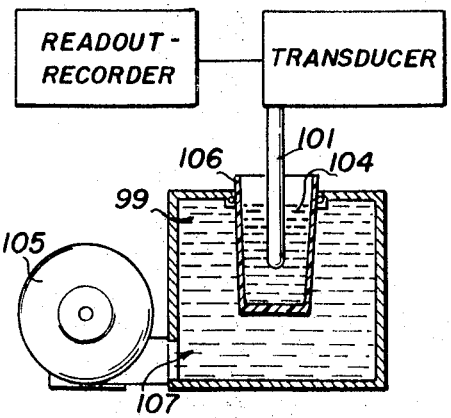
FIG. 10 is a schematic illustration in partial cross section showing a further energy input embodiment of the invention.

Since the apparatus is provided to measure the changes in characteristics for the fluid when the fluid is mechanically disturbed, other types of apparatus may be used to obtain the desired results. FIGS. 9 and 10 show alternate embodiments of the invention that are of interest. In FIG. 9 a motor 95 is used to rotate a spindle 97 having a plurality of eccentric arms 98 thereon. When this apparatus is brought into contact with the exterior of a cup 96, the fluid within the cup will be agitated, and energy will be transmitted to the probe rod 91. The level of transmitted energy can be sensed by a transducer connected to the rod 91, and a readout or record can thus be obtained.

In order to eliminate as many variables as possible, it may be necessary for some uses to maintain the sample at a regulated temperature. For present studies a temperature of 37° C. has been used for blood coagulation studies. This regulated temperature may be obtained through use of atmospheric condition controlling apparatus or bath elements. FIG. 10 illustrates a combination in which a bath component is used not only to regulate the temperature for the sample but further to transmit the input mechanical energy to the sample. In this embodiment of the invention the cup 106 is immersed in a bath component 99. The liquid in the bath is agitated by the intermittent pressurized output from a pump 105 delivered through bath inlet 107. Pulsations of energy from the pump are by this apparatus transmitted to the walls of the cup 106 which may be resilient to disturb the sample 104. The energy transmitted by the sample to the rod 101 is sensed by the transducer and exhibited by readout-recorder apparatus.

For all embodiments of the invention the sample is mechanically excited, and a reading is obtained indicative of the energy transmitted by the sample. As indicated by the described embodiments, various combinations of mechanical and electrical excitation and sensing apparatus may be used to satisfy the objects of the present invention.

Where blood coagulation studies are made, good results have been obtained where the amplitude of vibration is approximately one-thousandth of an inch. A relatively low range of vibrational energy is preferred in the order of 10 to 100 cycles per second. These desirable operating ranges can, of course, be obtained through use of the various mechanisms illustrated and described.

I claim:

1. The method for determining the coagulation characteristics of body fluid samples which comprises, without changing conditions of external heat, mechanically agitating the fluid sample, disposing a pickup component sensitive to the movement pattern of the agitated sample to measure the intensity of energy conducted by the sample to determine patterns of decreasing and increasing energy, and tabulating said energy patterns over a period of time to establish time spaced correlations thereof.

2. The method as set forth in claim 1 wherein a rate of change of energy reading is obtained to provide a further coagulation characteristic.

3. The method as set forth in claim 2 in which the measurement of energy is recorded to facilitate determination of said rate of change.

4. Apparatus for determining the coagulation characteristics of blood component samples without changing conditions of external heat comprising means for confining a sample of said blood component, a power source, means transmitting energy from said power source to the sample being tested whereby the blood component sample is agitated and coagulation thereof is promoted, an element in contact with said blood component sample and exposed to the agitation patterns thereof but out of contact with said energy transmitting means whereby energy impinged on said element will have been transmitted by said sample, pickup means for measuring the levels of energy thus transmitted to said element, and means for the observation and/or recording of said energy level measurements over a period of time whereby changes in the energy levels at said pickup are observed for indications of the coagulation characteristics of said sample.

5. Apparatus as set forth in claim 4 wherein said power source provides sound related vibrational movement of substantially one-thousandth of an inch amplitude.

6. Apparatus as set forth in claim 5 wherein the power source for providing vibrational energy is a transponder of a type useable in the propagation of sound.

7. Apparatus as set forth in claim 6 wherein said pickup means is a transducer sensitive to the vibrational output of said transponder.

8. Apparatus as set forth in claim 4 and further comprising a container for the retention of said sample and wherein said power source delivers pulsed energy against said container whereby the component sample is agitated.